(12) United States Patent
Lou et al.

(10) Patent No.: US 6,983,332 B1
(45) Date of Patent: Jan. 3, 2006

(54) PORT-BUNDLE HOST-KEY MECHANISM

(75) Inventors: Shuxian Lou, San Jose, CA (US);
Richard M. Pruss, Los Gatos, CA (US);
Ian M. Cotton, Reading (GB);
Mark C. Willis, Burghfield (GB);
Adam L. Taylor, Acton, MA (US)

(73) Assignee: Cisco Technology, Inc., San Jose, CA (US)

(*) Notice: Subject to any disclaimer, the term of this patent is extended or adjusted under 35 U.S.C. 154(b) by 690 days.

(21) Appl. No.: 09/841,587

(22) Filed: Apr. 23, 2001

(51) Int. Cl.
*G06F 15/16* (2006.01)
*G06F 3/00* (2006.01)

(52) U.S. Cl. .................... 709/246; 719/316; 719/321; 709/227; 709/228; 709/238; 709/245

(58) Field of Classification Search ........ 718/100–108; 709/200–253; 719/310–332
See application file for complete search history.

(56) References Cited

U.S. PATENT DOCUMENTS

| | | | | |
|---|---|---|---|---|
| 3,558,823 A | * | 1/1971 | Brilliant et al. ............. | 370/360 |
| 4,691,355 A | * | 9/1987 | Wirstrom et al. ........... | 713/159 |
| 6,718,139 B1 | * | 4/2004 | Finan et al. .................. | 398/59 |
| 2001/0043611 A1 | * | 11/2001 | Kadambi et al. ........... | 370/429 |

\* cited by examiner

*Primary Examiner*—Meng-Al T. An
*Assistant Examiner*—Kenneth Tang
(74) *Attorney, Agent, or Firm*—Thelen Reid & Priest LLP; Adrienne Yeung

(57) ABSTRACT

This invention provides for an apparatus and method to associate a subscriber with one of many port bundles in an aggregation device. The method reserves one of the port bundles for the subscriber if the subscriber was not assigned a port bundle, changes the original source port number in a data packet to a port bundle number, modifies the subscriber address to an assigned aggregation address, and issues a request to a remote management device for authentication of the subscriber. Once a response is received from the management device including the authentication or unauthentication of the subscriber, the subscriber is mapped with the reserved port bundle in a port bundle object and the reserved port bundle is then assigned to the subscriber. The apparatus has at least one source port to receive a data packet, several port bundles coupled to the source port, each port bundle having a memory with a port bundle object to associate the subscriber with one of the port bundles, a processor coupled to the port bundles, and an output port coupled to the processor.

25 Claims, 3 Drawing Sheets

PORT-BUNDLE HOST-KEY MECHANISM

FIELD OF THE INVENTION

The present invention relates to a method and apparatus to associate a subscriber with a port bundle. More particularly, the present invention relates to a method and apparatus for associating a subscriber with a port bundle in an aggregation device.

BACKGROUND OF THE INVENTION

The power of personal computers, terminals, servers and other stand-alone computing devices is significantly increased by connecting such devices together in a local area network (LAN). Using a network, individual users of stand-alone devices distributed over a large geographic area can access common resources and communicate. Networks themselves can be interconnected or "internetworked" locally or over a large area. Such networks also can be connected to a vast, global network, operating according to standard protocols, known as the Internet. Using the Internet and certain wide area network technologies, local users and devices can connect to, "log on" to, request and use distant devices and computing resources.

For subscriber/service deployment of Digital Subscriber Line (DSL) technologies, wireless, cable, and dial-up access networks, network access aggregation devices 200 (NAADs), as shown in FIG. 1, are used to direct traffic and manage subscribers and services. A user or subscriber 202 is able to simultaneously access the services provided by different Internet Service Providers (ISPs), corporate Layer 2 Tunneling Protocol (L2TP) access servers or any other similar type of servers. A typical NAAD 200 connects at least three different networks—the subscriber's network 202, the subscriber/service management network 204 (SSMN), and the service provider network 206 (SPN). The subscriber's network 202 is the network at which a user, subscriber, host, or client resides. The SSMN 204 is the network at which the subscriber/service management applications 208 (SSMA) resides. The SPN 206 provides the services for the subscribers, such as ISPs 210, application service providers, or corporate access providers. In this scenario, the NAAD 200 regulates the service selection and directs traffic for the subscribers.

The three different networks described above constitute a three-way communication among the parties for a subscriber's service selection. Existing implementations use a simple Host-Key mechanism. In this approach, a subscriber 202 communicates with the SSMA 208 by using Hypertext Transport Protocol (HTTP) via the NAAD 200 to indicate network access requests or service selections. When the NAAD 200 receives a HTTP packet 212, it forwards it to the SSMA 208 through SSMN 204 where the SSMA 208 uses the source Internet Protocol (IP) of the HTTP packet 212 as the Host-Key to identify the subscriber. The SSMA 208 then processes the HTTP packet 212 and communicates the request to the NAAD 200 via a private or management protocol between SSMA 208 and NAAD 200. The Host-Key 214 is carried in the packets of the private or management protocol so that both SSMA 208 and NAAD 200 can use it to identify traffic for the subscriber 202. On the subscriber network 202 side of the NAAD 200, the NAAD 200 uniquely identifies the subscriber 202 and its traffic by the layer 2 characteristic (such as line number, Permanent Virtual Circuit (PVC) input interface, or Media Access Control (MAC), etc.) of the subscriber. However, on the SSMN 204 side of the NAAD 200, the NAAD 200 can only use the Host-Key 214, a layer three entity, to identify the subscriber 202 and the traffic for it since the layer 2 characteristic of the subscriber cannot be preserved across the SSMN 204. This existing practice works fine for most scenarios. However, it has several disadvantages.

The Network Access Providers 216 (NAPs) own the NAAD 200 and SSMA 208 and provides transport and service selection for other service providers. In order for subscribers 202 to subscribe and/or select services at layer 3 by using web-based interface or log on to the access network, they need to communicate with SSMA 208 via NAAD 200 through SSMN 204. For subscribers 202 to access services, they need to communicate through the SPNs 206. Thus, subscribers 202 need to be able to communicate within both SPN 206 and SSMN 204. However, the SPNs 206 and SSMN 204 may not be under the same administrative entity. For example, the SSMN 204 may be administrated by the NAP 216 while the SPNs 206 are administrated by ISPs 210, and both the NAP 216 and ISPs 210 may have totally different IP addressing schemes.

The issues are made more complicated by the fact that ISPs may start using private IP addresses for subscribers and ISPs can no longer afford permanent global IP addresses for the subscribers. Furthermore, NAP may also start using private IP addresses for the SSMN for security reasons or to conserve IP addresses. Thus, this creates a difficult situation for routing a subscriber's traffic and identifying a subscriber.

First of all, when ISPs use the private IP address scheme for subscribers, different subscribers from different ISPs may have the same IP address, since the subscribers' IP addresses are assigned independently by the ISPs. The SSMA has no way to differentiate the two different subscribers by just using their source IP addresses. Thus, the old practice that uses the subscriber's IP address to differentiate subscribers is no longer applicable.

Secondly, when ISPs use the private IP address scheme for subscribers or NAPs use the private IP address scheme for the SSMN, the subscribers' source IP addresses may not be routable in the SSMN. A subscriber's IP address is visible to the SSMN when subscribers make HTTP requests to the SSMA via the NAAD. The SSMN may have difficulty in routing the HTTP replies from the SSMA back to the subscribers since the IP address is not routable in the SSMN. Thus, the old practice that uses the subscriber's IP address for implementing communication between subscribers and the SSMA is no longer applicable.

Thirdly, if global non-overlapped IP addresses are used, the issues of routing HTTP replies and identifying different subscribers are no longer issues for the SSMN and the SSMA. However, in order for the SSMA to communicate with the correct NAAD via the private protocol on behalf of a subscriber, the SSMA has to maintain a table of subscribers' IP addresses that are mapped to the NAADs and the SSMA has to be explicitly configured to service a particular NAAD. This is a huge provisioning problem for both service providers and access providers. This will be even more of a problem as dynamic IP address mechanisms are used.

Fourthly, miss-matching of a subscriber with a NAAD is a possible scenario. If a subscriber, who is connected to one NAAD, tries to log on to the NAAD by accessing a SSMA that is configured to service a different NAAD, the subscriber can be logged on to the different NAAD to which the subscriber has no physical connection. This causes the subscriber's traffic to travel through one NAAD, while the subscriber's information is created in another NAAD (i.e. the SSMA communicates with the wrong NAAD for the subscriber).

Lastly, the old practice that uses the subscriber's IP address to identify the subscriber creates an opportunity for subscribers or hackers to be intentionally or negligently destructive or disruptive to distant systems in many ways. For example, using a technique known as "IP spoofing," a user can change the IP address in a message sent from the user's computer so that messages or transaction requests sent to a remote network appear to be coming from somewhere else. Therefore, even if the network access devices and an application server are in a common administration zone, it is desirable to indicate a user identity derived from the user's connection to the NAAD to the application servers.

As described above, the use of a subscriber's IP address as identity for the subscriber is no longer meaningful. There is no standard method of allocation for IP addresses, and there is no security in the allocation of IP addresses. The non-secure nature of IP address in IP packed results in IP spoofing.

There are many mechanisms today, which try to do deal with the security issues. One solution is to include a "cookie" whereby data created by a Web server is stored on the user's computer. Cookies provide a way for the Web site to keep track of a user's patterns and preferences and, with the cooperation of the Web browser, to store them on the user's own hard disk. The cookies contain a range of Uniform Resource Locators (URLs) for which they are valid. When the browser encounters those URLs again, it sends those specific cookies to the Web server. For example, a user's identification (ID) is usually stored in a cookie. The cookies would save the user from retyping in the same information all over again when accessing that service for the second and subsequent time.

Another solution is Secure Sockets Layer (SSL). When an SSL session is started, the browser sends its public key to the server so that the server can securely send a secret key to the browser. The browser and server exchange data via secret key encryption during that session.

The problem with each solution, such as the use of cookies or SSL, is that they all rely on information from the user and have no solid connection to the network layer. The relationship between the user and the data packet is not known since the only identity in a data packet is its IP address, which, as discussed above, may be a spoof. Thus, the information which cookies and SSL rely on is non-secure and not reliable. Moreover, cookies and SSL only work for HTTP, the communication protocol used to connect to servers on the World Wide Web. Thus, they are not protocol independent.

Therefore, there exists a need for a more practical and secured mechanism, that is protocol independent, to create an association between a subscriber, a NAAD, and a SSMA.

BRIEF DESCRIPTION OF THE INVENTION

A method for associating a subscriber with one of many port bundles in an aggregation device reserves one of the port bundles for the subscriber if the subscriber was not assigned a port bundle, changes the original source port number in a data packet to a port bundle number, modifies the subscriber address to an assigned aggregation address, and issues a request to a remote management device for authentication of the subscriber. Once a response is received from the management device including the authentication or unauthentication of the subscriber, the subscriber is mapped with the reserved port bundle in a port bundle object and the reserved port bundle is then assigned to the subscriber. An apparatus implementing the method has at least one source port to receive a data packet, several port bundles coupled to the source port, each port bundle having a memory with a port bundle object to associate the subscriber with one of the port bundles, a processor coupled to the port bundles, and an output port coupled to the processor.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a Port-Bundle Host-Key Mechanism. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
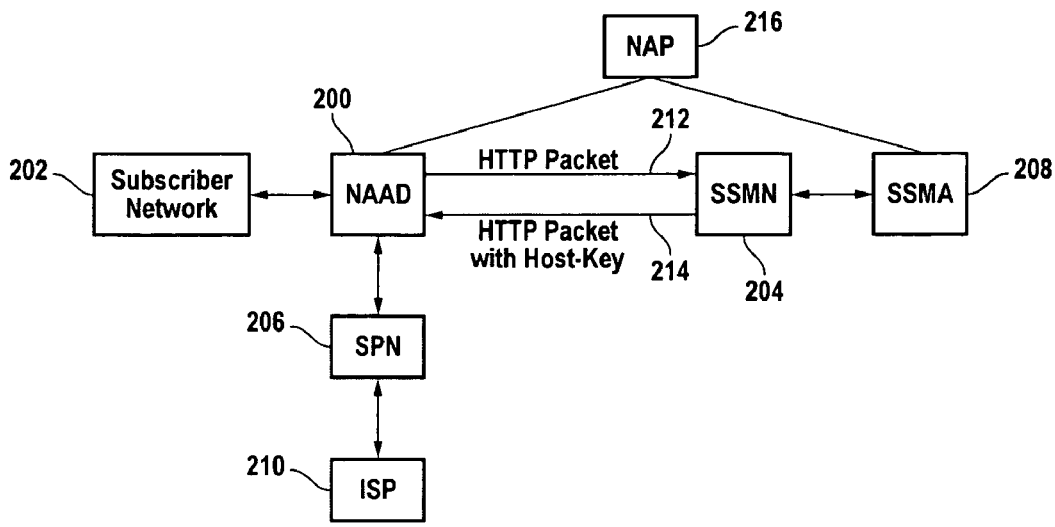
FIG. 1 is a block diagram illustrating the NAAD in accordance with the prior art.
Figure 3:
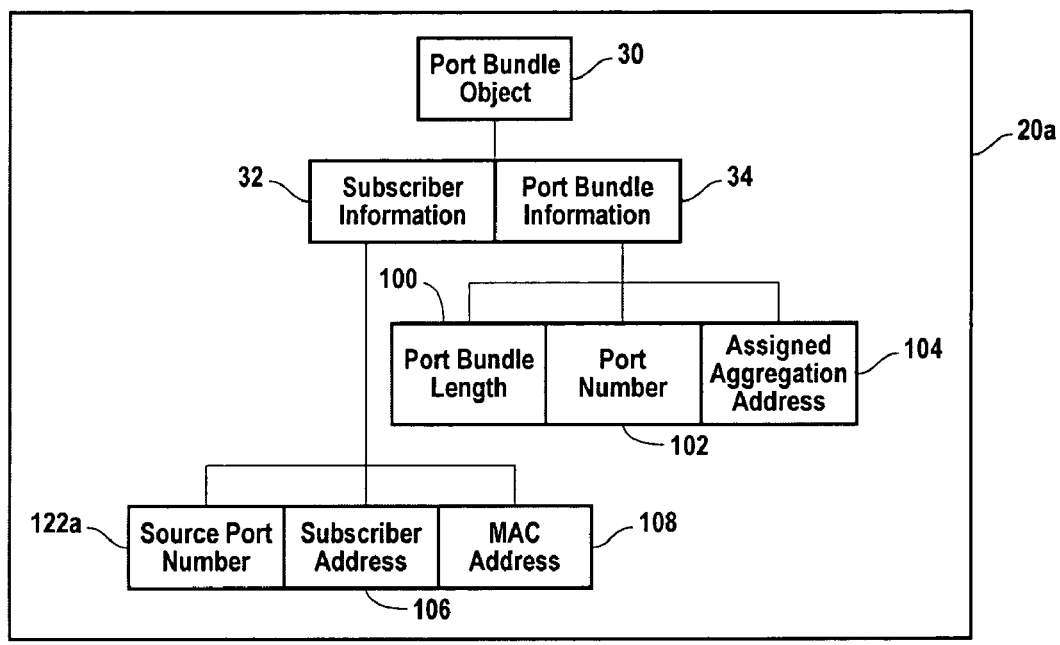
FIG. 3 is a diagram of the memory coupled to a port bundle showing the port mapping in accordance with a special embodiment of the present invention.
Figure 2:
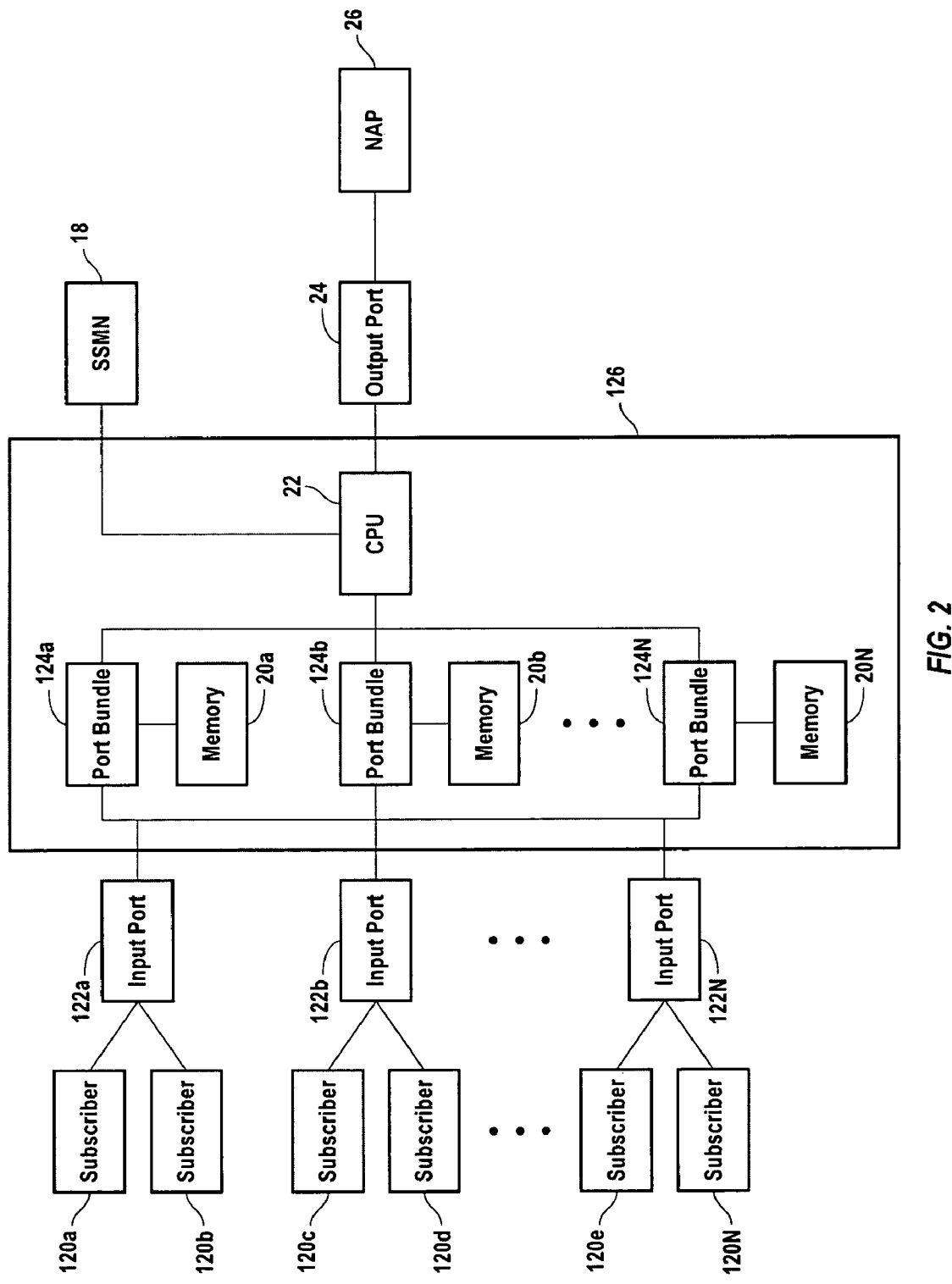
FIG. 2 is a diagram of a special embodiment of the present invention.

This invention provides for an apparatus to associate a subscriber with a port bundle in an aggregation device such as a service selection gateway (SSG), which may be a router or similar network device. Turning now to FIG. 2, subscribers 120(a–N) (N is an integer) send data packets to an aggregation device, generally referred to as 126, through input ports 122(a–N). When a data packet is received, the central processing unit (CPU) 22 determines whether the subscriber was assigned a port bundle by looking to the source IP address, host address, incoming interface, or any type of information configured by the network administrator. If a port bundle was not assigned, the CPU 22 reserves a port bundle for the subscriber. Each port bundle 124(a–N) has an associated memory 20(a–N) containing a port bundle object 30, as shown in FIG. 3. The port bundle object 30 contains a table pairing subscriber information 32 with port bundle information 34. Subscriber information may contain the source port number 122a, subscriber address 106, MAC address 108, NSP, destination and source addresses, and any other necessary information. The port bundle information consists of the port bundle length 100, port number 102, and the assigned aggregation address 104. The aggregation device 126 uses the port bundle object 30 to associate the subscriber with the port bundle by pairing the subscriber information with the port bundle information.

The aggregation device 126 may have more than one address, each address defining a bundle group. The assigned aggregation address is one of many aggregation addresses configured in the aggregation device by the network administrator that is routable in the management device. To increase scalability and provide for more subscribers, additional aggregation addresses may be configured in the aggregation device.

A port number is a range of sequential numbers starting from a base port number. Each sequential number is a 16-bit unsigned number greater than 1023. The numbers 1 through 1023 are called "well known port numbers" and are typically assigned to particular computer applications. As an example, it is well known to those of ordinary skill in the art that HTTP connections typically use port number 80. Thus, the port numbers used here are preferably greater than 1023 to avoid interfering with existing computer applications that use port numbers 1 through 1023. Each port number is paired and mapped with the source port number in the data packet.

Figure 4:
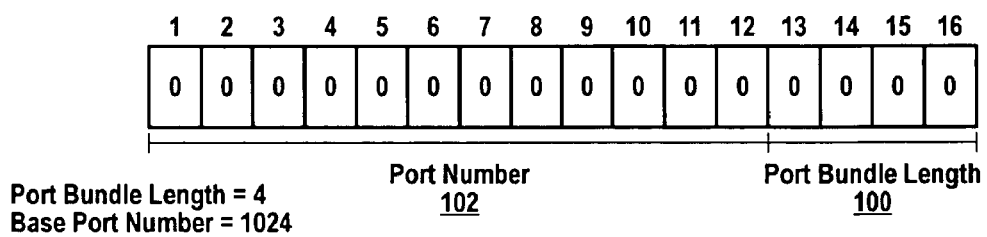
FIG. 4 is an example of port bundle in accordance with a specific embodiment of the present invention.

Port numbers comprise high and low order bits. The low order bits are the port bundle length and may be any number between 1 through 16. Any remaining bits, are called the high order bits, and may consist of the binary form of the port number or a similar identification thereof. Now referring to FIG. 4, as an example, if the port bundle length 100 is 4, bits 13 through 16 are the low order bits and bits 1 through 12 are the high order bits. If the port number 102 is 1024, the binary form is 10000000000 and the remaining high order bits would be 0. The range of sequential numbers in the port bundle (which is also the number of input ports available to the subscriber) is limited by the port bundle length: range of sequential port numbers (or available ports) $=2^{port\ bundle\ length}$. Thus, the port bundle numbers are a range of 16 numbers starting from 1024, which is the base port number, and ending at 1039. Furthermore, in one port bundle group, there are $2^{16-port\ bundle\ length}$ different bundles. In the example above, there are 4096 bundles in a group and 16 ports in each bundle. So, one bundle group can support up to 4096 subscribers with each subscriber having 16 sequential port numbers.

The data packets received from the subscribers are typically HTTP packets since a subscriber will most likely initiate a request through a web page displayed in a web browser on the subscriber's machine. If the subscriber has not been assigned a port bundle, the data packet is transmitted to a remote management device, such as the SSMN, to interpret the data packet and/or authenticate the subscriber since the aggregation device is unable to interpret HTTP packets.

For selected data packets only, the remote management device inserts a host-key header into the data packet, which allows the aggregation device to interpret the data packet. The host-key header contains the port number of the data packet and the assigned aggregation address. The types of data packets selected for insertion of a host-key may be configured by the network administrator. The data packets are typically service-type data packets that request a subscriber address, account information, a log-on or log-off request, a status query, or the like. Such data packets are typically routed between the management device and the aggregation device and not to a third party such as a NAP. For example, when a subscriber requests the service to be logged-on for the first time, a request is issued to the remote management device for interpretation of the data packet and authentication of the subscriber. The response to the aggregation device has the host-key header and authentication or unauthentication of the subscriber. The host-key header allows the aggregation device 126 to interpret the data packet and assign the reserved port bundle to the subscriber if the subscriber is authenticated. For all other data packets that are not configured as selected data packets, the aggregation device 126 simply routes the data packets through the output port 24 to the destination address in the data packet.

For traffic routed to the subscriber 120(a–N), the aggregation device 126 uses the port bundle object 30 to locate the subscriber by pairing or mapping the port bundle information 34 with the subscriber information 32. Once mapped, the aggregation address is changed back to the subscriber address and the port number is reset to the original source or input port. The traffic is forwarded to the subscriber.

The association between a subscriber 120(a–N) and the port bundle 124(a–N) is released when a subscriber 120 (a–N) is no longer logged-on to the aggregation device 126. The aggregation device 126 constantly maintains the state of the subscriber 120(a–N) and signals the remote management device 18 when there is a status change for subscriber 120(a-N). The aggregation device 126 reserves the base port number to signal a subscriber's state to the remote management device 18. Thus, when the remote management device 18 receives a data packet from the aggregation device 126 with the base port number, the remote management device 18 will recognize that there is a state change for the subscriber (i.e. logged on or logged off) and updates the subscriber's records accordingly.

By utilizing this invention, the remote management device will not need to know a subscriber's IP address scheme, which may be different from one NAP to another. This simplifies the routing requirements in the management device. Furthermore, this allows for the freedom to use private IP address schemes within the management device, which may have many advantages such as isolation from other networks, all the while having the ability to identify a subscriber and the aggregation device which connects to the subscriber. This invention also allows the management device to provide interactions with subscribers through a graphical user interface, such as web-based interface as well as simplifying the architectural designs for subscriber/service deployments for DSL, cable, wireless and dial-up networks by eliminating tedious provisioning works.

Furthermore, the subscriber's identity is indicated to the aggregation device free of implications for the subscriber application and possible tampering on the subscriber end of the connection. This invention, unlike other identity mechanisms utilized today, is application independent beyond the fact that the aggregation device needs to look to the network layer for the subscriber's identity. Moreover, since the subscriber's identity is indicated at the network layer, this invention is applicable even when the session between the subscriber and NSP is encrypted.

Figure 5:
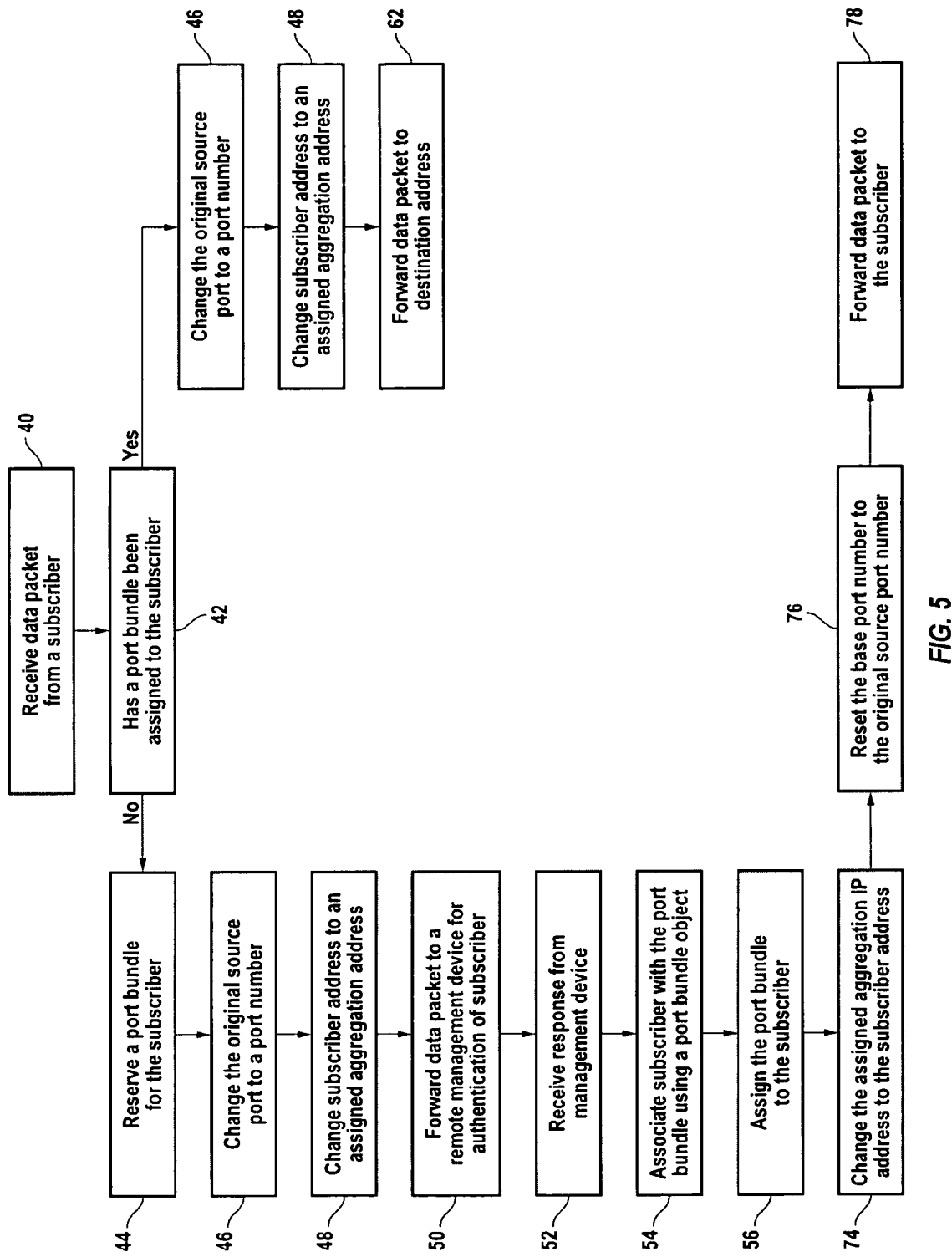
FIG. 5 is a flow diagram of a method in accordance with a specific embodiment of the present invention.

Referring now to FIG. 5, this invention further provides for a method to associate a subscriber with a port bundle in an aggregation device such as a service selection gateway, which may be a router or the like. The aggregation device receives data packets from subscribers (40). When received, the aggregation device determines whether the subscriber was assigned a port bundle by looking to the source IP address, host address, incoming interface, or any type of information configured by the network administrator (42). If a port bundle was not assigned to a subscriber, a port bundle is reserved for the subscriber (44). In either situations, the source port number is changed to a port number (46) and the subscriber address is changed to an assigned aggregation address (48). If the subscriber was assigned a port bundle, the data packet is forwarded to the destination address in the data packet (62). If the subscriber was not assigned a port bundle, the data packet is transmitted to a remote management device, such as the SSMN, to be interpreted (50). The data packets received from the subscribers are typically HTTP packets since a subscriber will most likely initiate a request through a web page displayed in a web browser on the subscriber's machine. Thus, the data packet is transmitted to a remote management device to interpret the data packet and authenticate the subscriber since the aggregation device is unable to interpret HTTP packets.

For selected data packets, the remote management device inserts a host-key header into the data packet, which enables the aggregation device to interpret the data packet. The host-key header contains the port number of the data packet and the assigned aggregation address. The types of data packets selected for insertion of a host-key may be configured by the network administrator. The data packets are typically service-type data packets that request a subscriber address, account information, a log on or log off request, a status query, or the like. Such data packets are typically routed between the management device and the aggregation device and not to a third party such as a NAP. For example, when a subscriber requests the service to be logged-on for the first time, a request is issued to the remote management device for interpretation of the data packet and authentication of the subscriber. The response sent to the aggregation device has the host-key header and an authentication or unauthentication of the subscriber. The host-key header allows the aggregation device to interpret the data packet and assign the reserved port bundle to the subscriber if the subscriber is authenticated (52).

The aggregation device uses a port bundle object coupled to the port bundle to associate the subscriber with the port bundle (54). The port bundle object contains a table pairing subscriber information with port bundle information. Subscriber information may contain the source port number, subscriber address, MAC address, NSP, destination and source addresses, and any other necessary information. The port bundle information consists of the port bundle length, port number, and the assigned aggregation address. The port bundle object associates the subscriber with the port bundle by pairing the subscriber information with the port bundle information. Once associated, the aggregation device then assigns the port bundle to the subscriber (56).

For traffic routed to the subscriber, the aggregation device uses the port bundle object to locate the subscriber by pairing or mapping the port bundle information with the subscriber information. Once mapped, the aggregation address is changed back to the subscriber address (74) and the port number is reset to the original source or input port (76). The traffic is forwarded to the subscriber (78).

The association between a subscriber and the port bundle is released when a subscriber is no longer logged on to the aggregation device. The aggregation device constantly maintains the state of the subscriber and signals the management device when there is a status change for subscriber. The aggregation device reserves the base port number to signal a subscriber's state to the management device. Thus, when the management device receives a data packet from the aggregation device with the base port number, the management device will recognize that there is a state change for the subscriber (i.e. logged on or logged off) and updates the subscriber's records accordingly.

By utilizing this invention, the management device will not need to know a subscriber's IP address scheme, which may be different from one NAP to another. This simplifies the routing requirements in the management device. Furthermore, this allows for the freedom to use private IP address schemes within the management device, which may have many advantages such as isolation from other networks all the while having the ability to identify a subscriber and the aggregation device which connects to the subscriber. This invention also allows the management device to provide interactions with subscribers through a graphical user interface, such as web-based interface as well as simplifying the architectural designs for subscriber/service deployments for DSL, cable, wireless and dial-up networks by eliminating tedious provisioning works.

Furthermore, the subscriber's identity is indicated to the aggregation device free of implications for the subscriber application and possible tampering on the subscriber end of the connection. This invention, unlike other identity mechanisms utilized today, is application independent beyond the fact that the aggregation device needs to look to the network layer for the subscriber's identity. Moreover, since the subscriber's identity is indicated at the network layer, this invention is applicable even when the session between the subscriber and NSP is encrypted.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for associating a specific subscriber with one of a plurality of port bundles, comprising:
reserving one of the plurality of port bundles for the specific subscriber if the specific subscriber has not been assigned one of the plurality of port bundles, the plurality of port bundles associated with an aggregation device;

changing an original source port number in a data packet to a port bundle number corresponding to the reserved one of the plurality of port bundles;

modifying a subscriber address in the data packet to an assigned aggregation address;

issuing a request to a remote management device for authentication of the specific subscriber;

receiving a response from the remote management device including a state of authentication of the specific subscriber;

creating a mapping between the specific subscriber and the reserved one of the plurality of port bundles;

saving the mapping in a port bundle logical object; and assigning the reserved one of the plurality of port bundles to the specific subscriber if the specific subscriber is authenticated.

2. The method of claim 1, wherein each of the plurality of port bundles includes a port bundle length, a port number, and an assigned aggregation address.

3. The method of claim 2, wherein the port bundle number includes a range of sequential port numbers starting with a base port number.

4. The method of claim 3, wherein the range of sequential port numbers is approximated by $$\text{range of sequential port numbers} = 2^{port\ bundle\ length}.$$

5. The method of claim 2, wherein the port bundle length is an integer in a range of 1 to 16.

6. The method of claim 1, further comprising maintaining a status for the specific subscriber.

7. The method of claim 6, further comprising signaling the status to the remote management device.

8. The method of claim 6, wherein the status indicates whether the specific subscriber is logged-on or logged-off.

9. The method of claim 1, further comprising:

changing the assigned aggregation address to the subscriber address;

resetting the port number to the original source port number; and transmitting the data packet to the specific subscriber.

10. An apparatus for associating a specific subscriber with one of a plurality of port bundles, comprising:

at least one source port to receive at least one data packet, the data packet having a subscriber address;

each of the one of the plurality of port bundles coupled to the source port;

a plurality of memories, each of the plurality of memories coupled to one of the plurality of port bundles;

a port bundle logical object coupled to each of the plurality of memories to associate the specific subscriber with the one of the plurality of port bundles, wherein the port bundle logical object is coupled to the one of the plurality of port bundles such that a mapping between the specific subscriber and the one of the plurality of port bundles is created and saved in the port bundle logical object;

a processor coupled to the plurality of port bundles, wherein said processor is configured to reserve the one of the plurality of port bundles for the specific subscriber if the specific subscriber has not been assigned one of the plurality of port bundles, the plurality of port bundles associated with an an aggregation device, said processor further configured to assign the one of the plurality of port bundles to the specific subscriber if the specific subscriber is authenticated; and an output port coupled to the processor.

11. The apparatus of claim 10, wherein each of the plurality of port bundles includes a port bundle length, a port number, and an assigned aggregation address.

12. The apparatus of claim 11, wherein the port number includes a range of sequential port numbers starting with a base port number.

13. The apparatus of claim 12, wherein the range of sequential numbers is approximated by $$\text{range of sequential port numbers} = 2^{port\ bundle\ length}.$$

14. The apparatus of claim 11, wherein the port bundle length is an integer in a range of 1 to 16.

15. The apparatus of claim 12, wherein the port number signals the status of said subscriber.

16. An apparatus for associating a specific subscriber with one of a plurality of port bundles, comprising:

means for reserving one of the plurality of port bundles for the specific subscriber if the specific subscriber has not been assigned one of the plurality of port bundles, the plurality of port bundles associated with an aggregation device;

means for changing an original source port number in a data packet to a port bundle number corresponding to the reserved one of the plurality of port bundles;

means for modifying a subscriber address in the data packet to an assigned aggregation address;

means for issuing a request to a remote management device for authentication of the specific subscriber;

means for receiving a response from the remote management device including a state of authentication of the specific subscriber;

means for creating a mapping between the specific subscriber and the reserved one of the plurality of port bundles;

means for saving the mapping in a port bundle logical object; and means for assigning the reserved one of the plurality of port bundles to the specific subscriber if the specific subscriber is authenticated.

17. The apparatus of claim 16, wherein each of the plurality of port bundles includes a port bundle length, a port number, and an assigned aggregation address.

18. The apparatus of claim 17, wherein the port bundle number includes a range of sequential port numbers starting with a base port number.

19. The apparatus of claim 18, wherein the range of sequential port numbers is approximated by $$\text{range of sequential port numbers} = 2^{port\ bundle\ length}.$$

20. The apparatus of claim 17, wherein the port bundle length is an integer in a range of 1 to 16.

21. The apparatus of claim 15, further comprising means for maintaining a status for the specific subscriber.

22. The apparatus of claim 21, further comprising means for signaling the status to the remote management device.

23. The apparatus of claim 21, wherein said status indicates whether the specific subscriber is logged-on or logged-off.

24. The apparatus of claim 15, further comprising:

means for changing the assigned aggregation address to the subscriber address;

means for resetting the port number to the original source port number; and means for transmitting the data packet to the specific subscriber.

25. A program storage device readable by a machine, tangibly embodying a program of instructions executable by the machine to perform a method for associating a specific subscriber with one of a plurality of port bundles, said method comprising:

reserving one of the plurality of port bundles for the specific subscriber if the specific subscriber has not been assigned one of the plurality of port bundles, the plurality of port bundles associated with an aggregation device;

changing an original source port number in a data packet to a port bundle number corresponding to the reserved one of the plurality of port bundles;

modifying a subscriber address in the data packet to an assigned aggregation address;

issuing a request to a remote management device for authentication of the specific subscriber;

receiving a response from the remote management device including a state of authentication of the specific subscriber;

creating a mapping between the specific subscriber and the reserved one of the plurality of port bundles;

saving the mapping in a port bundle logical object; and assigning the reserved one of the plurality of port bundles to the specific subscriber if the specific subscriber is authenticated.

* * * * *